United States Patent [19]

Chevereau et al.

[11] Patent Number: 4,925,624
[45] Date of Patent: May 15, 1990

[54] PRESSURIZED WATER NUCLEAR REACTOR WITH SOLID PARTITIONING

[75] Inventors: Gérard Chevereau, Le Raincy; Claude Cauquelin, Neauphle le Chateau; Alain Heuze, Paris, all of France

[73] Assignee: Framatome, Courbevoie, France

[21] Appl. No.: 286,820

[22] Filed: Dec. 20, 1988

[30] Foreign Application Priority Data

Dec. 22, 1987 [FR] France ............... 87 17923

[51] Int. Cl.$^5$ ................ G21C 11/06; G21C 15/02
[52] U.S. Cl. ................... 376/400; 376/459
[58] Field of Search ........... 376/433, 459, 377, 389, 376/390, 399, 400, 302, 304, 427

[56] References Cited

U.S. PATENT DOCUMENTS

| | | |
|---|---|---|
| 3,133,000 | 5/1964 | Hartnell-Beavis ............ 376/400 |
| 3,238,106 | 3/1966 | Long et al. .................. 376/427 |
| 3,247,070 | 4/1966 | Challender et al. ........... 376/459 |
| 4,087,324 | 5/1978 | Johnson et al. .............. 376/458 |
| 4,102,740 | 7/1978 | Blum et al. ................. 376/458 |
| 4,158,605 | 6/1979 | Cooper, Jr. et al. .......... 376/400 |
| 4,543,232 | 9/1985 | Elter et al. ................ 376/458 |
| 4,569,820 | 2/1986 | Fortescue ................... 376/427 |
| 4,675,152 | 6/1987 | Verdeau et al. .............. 376/400 |
| 4,701,299 | 10/1987 | Alibran et al. . | |
| 4,704,248 | 11/1987 | Lee et al. .................. 376/427 |
| 4,751,043 | 6/1988 | Freeman et al. .............. 376/400 |

FOREIGN PATENT DOCUMENTS

| | | | |
|---|---|---|---|
| 623506 | 2/1963 | Belgium ................. 376/458 |
| 624287 | 2/1963 | Belgium ................. 376/459 |
| 0059130 | 9/1982 | European Pat. Off. . | |
| 1128055 | 4/1962 | Fed. Rep. of Germany ...... 376/458 |
| 977019 | 12/1964 | United Kingdom ............ 376/459 |

Primary Examiner—Harvey E. Behrend
Attorney, Agent, or Firm—Pollock, Vande Sande & Priddy

[57] ABSTRACT

A pressurized water nuclear reactor with solid partitioning comprises a core formed by assemblies of prismatic shape disposed side by side inside a vertical cylindrical casing. A space between the core and the casing receives a solid partitioning structure. The partitioning is formed as a vertical stack of rings each completely surrounding the core, whose external periphery is engaged with a clearance in the casing and whose internal periphery matches the external contour of the core. The rings are centered and indexed with respect to the core casing by keys fixed to the casing and projecting into vertical grooves formed in the rings and they are formed with vertical mutually aligned holes defining cooling channels. Plugs in the channels define restricted water flow passages.

10 Claims, 2 Drawing Sheets

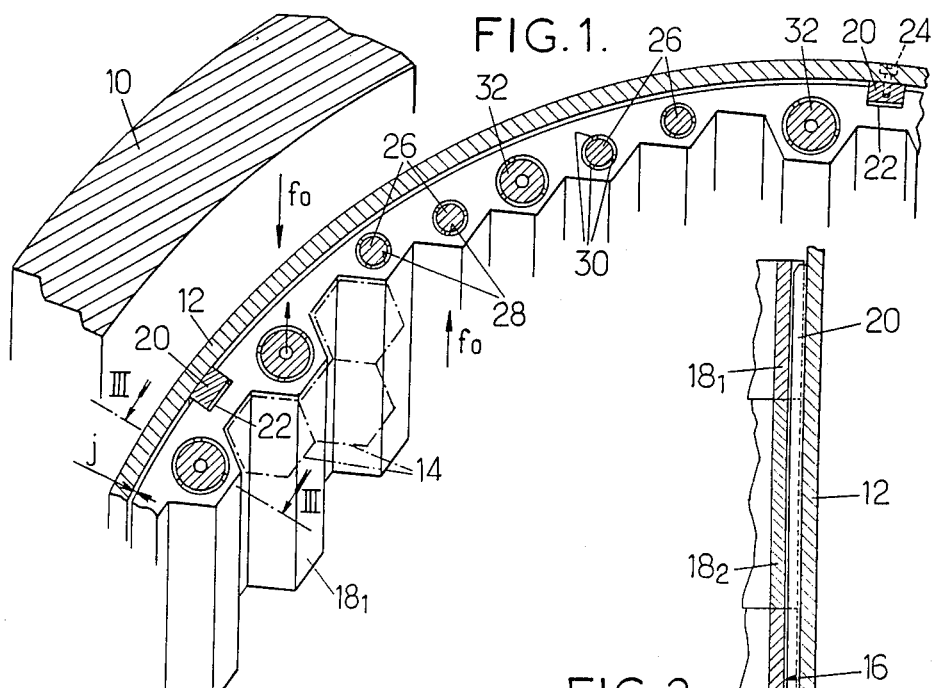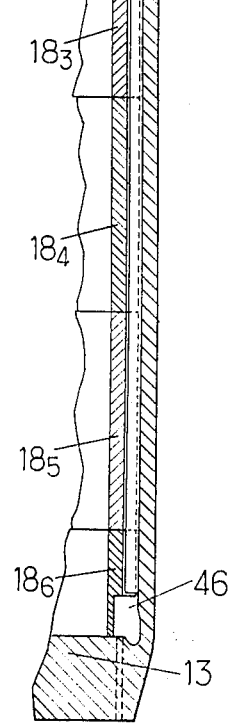

PRESSURIZED WATER NUCLEAR REACTOR WITH SOLID PARTITIONING

BACKGROUND OF THE INVENTION

1. Technical Field

The invention relates to pressurized water nuclear reactors of the type having a core formed by fuel assemblies of prismatic shape disposed side by side inside a cylindrical core casing having a vertical axis and defining, between the core and the casing, a space in which a solid partitioning structure is disposed.

2. Prior Art

Nuclear reactors of the above-defined type are already known. As compared with conventional partitioning, formed of a set of metal sheets, called "baffle plates", forming a polyhedron surrounding the core, and of formers distributed over the height of the core, solid partitioning is a better neutron reflector since the partitioning structure is then formed essentially of materials, such as iron, reflecting the neutrons better than water.

Different solid partitionings are known. European No. 051,390 describes a solid partitioning structure comprising columns disposed side by side and each formed of stacked modular blocks, secured to the lower core supporting plate by tie rods. The modular blocks are secured to each other by vertical keys, in an arrangement similar to that used in the graphite stacks of graphite-gas reactors. The modular blocks are cooled by water circulation in vertical channels formed by mutually aligned holes in the blocks.

That construction has drawbacks. Since the partitioning structure is not connected to the core casing, it is not centered accurately with respect to the casing. The water in the large number of cooling channels, required for limiting the stresses and deformations of thermal origin, greatly reduces the reflecting power of the partitioning and the water flow short-circuiting the core reduces the temperature of the coolant at the outlet of the reactor. The clearances between the modular blocks are swept by a water flow in addition to that passing through the channels.

A more advantageous partitioning device is described in European No. 0,117,768; it is formed of juxtaposed modular blocks fixed to the core casing and separated from each other by thin wedges. With this arrangement, the cooling water flow through the partitioning may be accurately adjusted. But this solution is still not perfect, particularly because it uses a large number of assembling screws subjected to high stresses and because clearances may exist between the blocks located in the proximity of the fuel assemblies and give rise to water jets directed towards some of the fuel rods and inducing vibrations.

SUMMARY OF THE INVENTION

It is an object of the invention to provide a nuclear reactor of the above-defined type having an improved solid partitioning structure, particularly in that the cooling water flow is better organized and the component elements of the partitioning are connected by means for which there is no substantial risk of breakage under stress.

To this end, there is provided a nuclear reactor whose solid partitioning structure is formed as a vertical stack of rings surrounding the core, whose external periphery is separated from the casing by a clearance, and whose internal periphery matches the external contour of the core, said rings being centered with respect to the core casing by keys fixed to the casing and projecting into vertical grooves in the rings, and being formed with vertical mutually aligned holes defining cooling channels containing plugs which define restricted flow passages.

BRIEF DESCRIPTION OF THE DRAWINGS

The invention will be better understood from the following description of a particular embodiment given by way of example only. The description refers to the accompanying drawings.

FIG. 1 is a perspective top view showing a fraction of a solid partitioning structure according to an embodiment of the invention;

FIG. 2 is a vertical sectional view of the partitioning structure of FIG. 1;

DETAILED DESCRIPTION OF A PREFERRED EMBODIMENT

Figure 3:
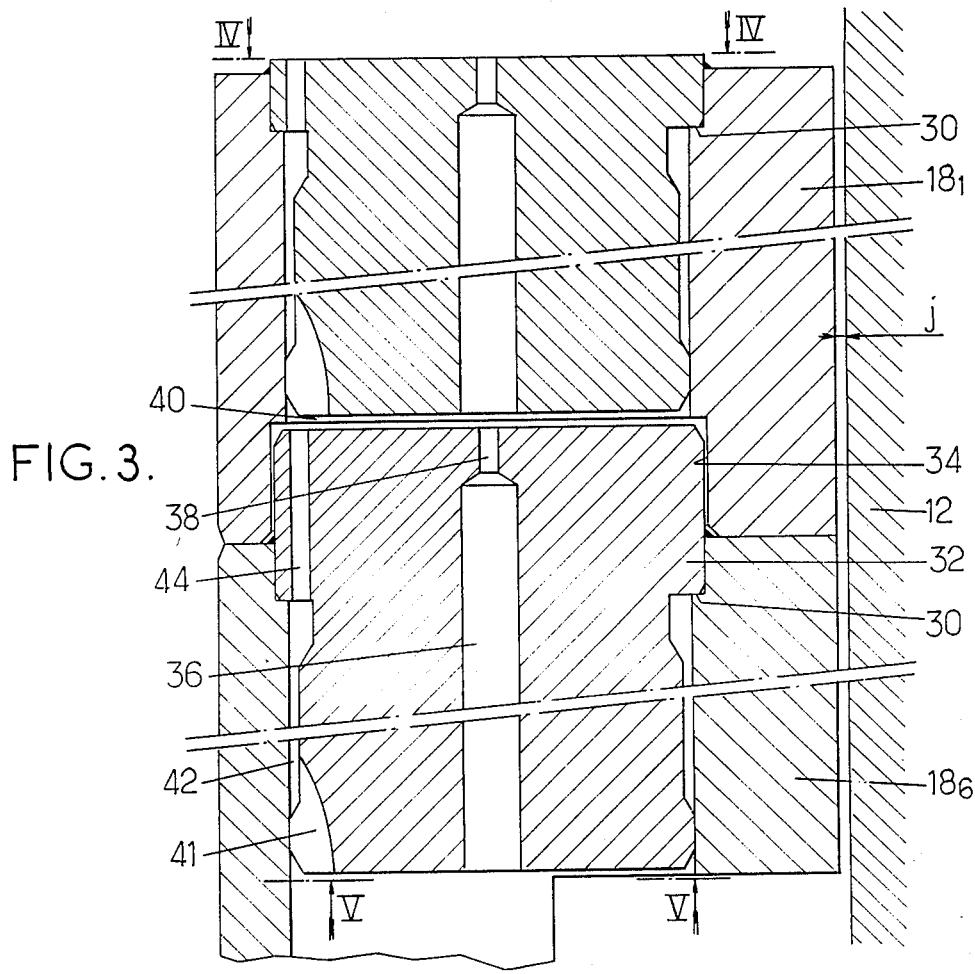
FIG. 3 is an enlarged view showing two plugs of the partitioning structure of FIG. 1, in cross-section through a plane passing through the axis of the plugs.

The core partitioning structure which will now be described is suitable for use in a pressurized water nuclear reactor whose general construction is comparable to that of the reactors described in European Patent Nos. 0,59,130 and 0,117,168, to which reference may be made. The nuclear reactor comprises a cylindrical reactor vessel 10 with a closure lid (not shown). A cylindrical casing 12 situated inside the vessel defines therewith an annular passage through which water admitted into the vessel flows down to the bottom of the reactor and then flows up through the core. This core is formed by juxtaposed upstanding fuel assemblies 14 resting on a lower core plate 13. The contour of some of these fuel assemblies is shown in dash-dot lines in FIG. 1. As shown, the assemblies have a hexagonal cross-section, but the invention could be used in a reactor whose fuel assemblies have a square cross-section.

The water flows through the reactor along the path indicated by the arrows Fo.

Since the core is formed of assemblies of hexagonal cross-section, it has an overall cross-section whose periphery comprises facets whose length is equal to the width of a fuel assembly side. Partitioning 16 occupies substantially the whole annular space between the external surface of the core and the internal face of casing 12. It is formed by a stack of rings whose cross-section has an internal periphery matching the external contour of the core, and whose external periphery is circular. The diameter of the external periphery is such that a clearance J exists between casing 12 and the partitioning.

The number of rings forming the partitioning is chosen so that the unitary weight of the rings does not exceed manufacturing and handling possibilities. When casing 12 has, for example a diameter of about 4 m, the partitioning 16 may consist of five or six rings. In the case of a power production reactor of 1300 MWe, the height of each ring is then about 0.9 m. Referring to FIG. 2, partitioning 16 has been shown formed of an upper ring $18_1$, four mutually identical median rings $18_2$–$18_5$ and a lower ring $18_6$ which rests on the lower core plate 13, welded to casing 12. The rings will be generally of stainless steel, although other materials may be used.

(Each of the rings $18_1$–$18_6$ is centered and indexed in casing 12 by keys fixed to casing 12 and projecting into grooves 22 formed longitudinally in the rings. The depth of grooves 22 is such that a gap exists between the bottom of the grooves and the non-working face of the keys and constitutes a path for a cooling water flow whose rate is adjustable by selecting the value of the gap. Keys 20 are fixed to casing 12 by any appropriate means, for example bolts 24. The keys may extend over the whole length of casing 12, as shown in FIG. 2. They may also formed of independent separate sections.

Centering of the rings with respect to each other may be complemented by engaging the rings into each other and by providing the rings with a sliding connection on common guide elements extending over the entire height of the partitioning. In the embodiment shown in FIG. 1, vertical posts 26 resting on the lower core plate 13 or fixed to this plate pass through aligned passages 28 in all the rings. The diameter of passages 28 is such that a clearance exists around the posts for a flow of cooling water. For the clearance to be uniform, the posts are advantageously provided with centering fins such as those shown at 30 in FIG. 1. Keys 20, posts 26 and possibly the mutual engagement of rings $18_1$–$18_6$ and engagement of the lower ring $18_6$ on the lower core plate guarantee a high degree of positioning accuracy.

Referring to FIG. 1, the partitioning, due to the irregular shape of the periphery of the core, has thicker parts which cannot be sufficiently cooled by a central channel of small diameter. The problem is solved, as illustrated in FIG. 1, by cooling such parts with a water flow in an annular passage of relatively large diameter, but of small and uniform thickness.

Figures 4, 5:
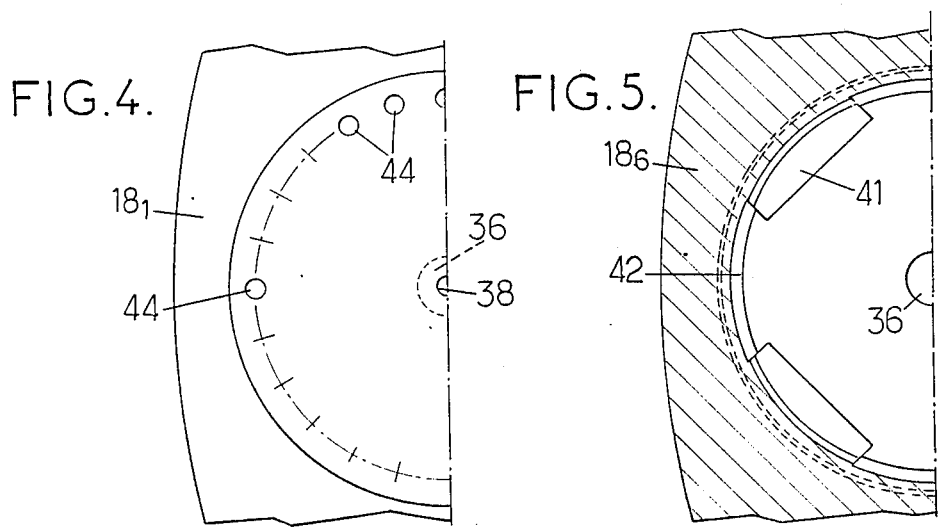
FIGS. 4 and 5 are views through lines IV—IV and V—V, respectively, of FIG. 3.

In the example shown in FIGS. 3 to 5, each ring $18_1$–$18_6$ has three cylindrical holes with a shoulder 30 for engagement of a plug 32. All plugs, except those carried by the upper ring $18_1$, have an upwardly projectinq portion which engages into a corresponding cavity 34 of the ring placed thereabove. An axial passage 36 is formed through and along each plug. It has a restricted zone 38 providing a head loss for adjusting the flow rate. A balancing chamber 40 is reserved between two successive plugs. The set of passages 36 forms a water path for cooling the aligned plugs.

Another flow path is formed at the periphery of the plugs. It comprises, for each ring: inlet sectors defined by flat faces 41 of the plugs, between radial bearing and centering projections 42; the annular clearance between the hole and plug below shoulder 30; and channels 44 distributed at the periphery of the plug and opening into chamber 40. A flow of water is thus established from a distribution chamber 46 formed by an annular narrowing of the solid partitioning (FIG. 2) and a plenum or collection chamber, above the core.

Some of the holes formed in the partitioning may be occupied by tie rods (not shown) for applying the set of rings against the lower core plate 13; the tie rods are also cooled by water flowing between the tie rod and the partitioning.

The clearance j which exists between the periphery of the partitioning and the casing 12 when the reactor is cold will, for a power production reactor of 1300 MWe, be generally about 4 mm; the clearance confronting keys 20 and around posts 26 and plugs 32 may be about 3 mm. The diameter of the plugs may be in the range from 60 to 140 mm.

It will be appreciated that the invention avoids any fixing by bolts, except for the centering keys 20; the passages through the partitioning may be few in number, while of large diameter, which facilitates their construction over great vertical depths. The risk of having water jets directed towards fuel rods is overcome. Finally, the low value of the clearances results in a low content of water in the partitioning.

We claim:

1. A pressurized water nuclear reactor having
   a core formed by fuel assemblies of prismatic shape disposed side by side inside a cylindrical casing having a vertical axis;
   a solid partitioning located in a space reserved between the core and the casing, the partitioning being formed as a vertical stack of rings each completely surrounding the core, whose external periphery is received in the casing and separated therefrom by a clearance and whose internal periphery matches the external contour of the core; and
   keying means fixed to the casing and projecting into vertical grooves formed in the rings for centering said rings with respect to the core casing,
   wherein said stack is formed with a plurality of vertical channels each consisting of a plurality of vertical mutually aligned passages each formed in a respective one of said rings, each channel containing a plurality of vertically aligned plugs and each of said plugs being devoid of connection with the other ones of the plugs, being individually supported by a respective one of said rings, being centered in the passage in the respective ring and defining therewith a restricted water flow passage, some at least of said plugs projecting upwardly above the respective ring into a cavity of the ring placed above said respective ring.

2. Reactor according to claim 1, wherein the grooves have a depth such that a clearance exists between the bottom of each of said grooves and a confronting face of the respective keying means for a flow of cooling water to occur within said clearance.

3. Reactor according to claim 1, wherein the rings are mutually resting on each other, and have a sliding connection with common guide elements extending over the whole height of the partitioning and fixed to a lower core plate.

4. Reactor according to claim 1, wherein the rings are formed with additional mutually aligned passages for receiving vertical posts resting on a lower core plate, a radial clearance being reserved between each said post and the respective passage and each said post being provided with fins for centering of the post in the respective passages.

5. A pressurized water nuclear reactor having
   a core formed by fuel assemblies of prismatic shape being disposed side by side inside a cylindrical casing having a vertical axis;
   a solid partitioning located in a space reserved between the core and the casing, the partitioning being formed as a vertical stack of rings each completely surrounding the core, whose external periphery is received in the casing and separated therefrom by a clearance and whose internal periphery matches the external contour of the core; and keying means fixed to the casing and projecting into vertical grooves formed in the rings for centering said rings with respect to the core casing, wherein said stack is formed with a plurality of vertical channels each consisting of a plurality of vertical mutually aligned passages each formed in a respective one of said rings, each channel containing a plurality of vertically aligned plugs, wherein said vertical passages are formed in radially thicker parts only of the rings, the plugs are carried by respective shoulders formed in the rings between a lower surface and an upper surface thereof and each of said plugs cooperate with the respective ring to define an annular water flow channel which includes a serial arrangement of a radial clearance formed between the respective passage and a lower portion of one of said plugs below the shoulder of the respective plug and of holes distributed in a radially outer portion of the plug across a bulged upper portion thereof.

6. Reactor according to claim 5, wherein each of the plugs projects above the respective ring and engages into a corresponding cavity of the ring placed immediately above that of the ring on which the plug rests.

7. Reactor according to claim 6, wherein a pressure balancing chamber is formed between the upper face of one of the plugs and the lower face of the plug situated above.

8. Reactor according to claim 1, wherein the plugs further include aligned axial passages each having a restricted zone.

9. Reactor according to claim 1, wherein the height of each ring is about 0.9 m.

10. A pressurized water nuclear reactor having:
a core formed by fuel assemblies of prismatic shape disposed side by side inside a cylindrical casing having a vertical axis;
a solid partitioning located in a space reserved between the core and the casing, said partitioning comprising a vertical stack of five or six mutually supporting solid rings each completely surrounding the core, whose external periphery is received in the casing and separated therefrom by a clearance and whose internal periphery matches the external contour of the core;
keying means fixed to the casing and projecting into vertical grooves formed in the rings for centering said rings with respect to the core casing, and
a plurality of vertical columns of plugs distributed in the partitioning, each of said plugs in any one of said columns being individually received in a passage in a respective one of said rings, having a downwardly facing shoulder supported by a cooperating upwardly directed shoulder of passage in the respective ring, being centered within the passage in the ring and defining a restricted water flow passage therewith, all the ring passages receiving the plugs of a same one of said columns being mutually aligned whereby a restricted water path exists throughout said partitioning.

* * * * *